(12) United States Patent
Ehlert et al.

(10) Patent No.: US 11,893,838 B2
(45) Date of Patent: Feb. 6, 2024

(54) VEHICLE ELECTRONIC REPAIR AND DIAGNOSTIC SYSTEM AND METHOD

(71) Applicant: Ford Global Technologies, LLC, Dearborn, MI (US)

(72) Inventors: Michael Ehlert, Livonia, MI (US); Adam Rainey, Monroe, CT (US); Robert S. Kern, Eastpointe, MI (US); Beau Stephen Troychak, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 535 days.

(21) Appl. No.: 16/803,722

(22) Filed: Feb. 27, 2020

(65) Prior Publication Data

US 2021/0272393 A1  Sep. 2, 2021

(51) Int. Cl.
| | |
|---|---|
| *G07C 5/08* | (2006.01) |
| *G06Q 10/20* | (2023.01) |
| *G05B 23/02* | (2006.01) |
| *B60S 5/04* | (2006.01) |

(52) U.S. Cl.
CPC .......... G07C 5/0808 (2013.01); B60S 5/046 (2013.01); G05B 23/0213 (2013.01); G06Q 10/20 (2013.01)

(58) Field of Classification Search
CPC ...... G07C 5/808; G07C 5/816; G05B 23/272; G05B 23/275; G05B 23/0213; B60S 5/046; G06Q 10/20
See application file for complete search history.

(56) References Cited

U.S. PATENT DOCUMENTS

| | | | | |
|---|---|---|---|---|
| 8,315,760 | B2 * | 11/2012 | Costantino | G06F 16/24573 701/34.2 |
| 8,954,222 | B2 | 2/2015 | Costantino | |
| 8,977,424 | B2 | 3/2015 | Ishimaru et al. | |
| 8,996,235 | B2 | 3/2015 | Singh et al. | |
| 2004/0025085 | A1 * | 2/2004 | Yoon | H04L 41/12 714/37 |
| 2006/0149434 | A1 * | 7/2006 | Bertosa | G07C 5/008 701/31.4 |
| 2012/0173076 | A1 * | 7/2012 | Anderson | F02D 41/221 73/114.31 |

(Continued)

FOREIGN PATENT DOCUMENTS

KR 100580806 B1 * 5/2006 ............ B66F 17/003

*Primary Examiner* — Rutao Wu
*Assistant Examiner* — Stephen S Swartz
(74) *Attorney, Agent, or Firm* — Burris Law, PLLC (57) ABSTRACT

A diagnostic system and method for troubleshooting an electronic system of a vehicle includes receiving a diagnostic trouble code set into a diagnostic system. The diagnostic trouble code set includes one or more diagnostic trouble codes. The method includes receiving diagnostic specifications. The diagnostic specifications associate connector pins and wires of the electronic system with possible diagnostic trouble codes. The method includes receiving wiring circuit specifications. The wiring circuit specifications associate wiring circuits of the electronic system with the connectors of the electronic system. The method includes determining a set of possible repair locations based on the diagnostic trouble code set, the diagnostic specifications, and the wiring circuit specifications, and displaying at least one possible repair location of the set of possible repair locations.

20 Claims, 5 Drawing Sheets

(56) References Cited

U.S. PATENT DOCUMENTS

| | | | |
|---|---|---|---|
| 2013/0054082 A1* | 2/2013 | Costantino | G05B 23/0272 |
| | | | 701/29.6 |
| 2015/0142257 A1* | 5/2015 | Merg | G07C 5/008 |
| | | | 701/31.5 |
| 2017/0263060 A1* | 9/2017 | Sukumaran | G07C 5/0825 |
| 2018/0081857 A9 | 3/2018 | Chen et al. | |
| 2018/0234174 A1* | 8/2018 | Courter | H04Q 11/0005 |
| 2019/0130670 A1 | 5/2019 | Takao et al. | |
| 2020/0223385 A1* | 7/2020 | Brozovich | G07C 5/0808 |
| 2022/0046114 A1* | 2/2022 | Entelis | H04L 12/40 |

\* cited by examiner

FIG. 6

VEHICLE ELECTRONIC REPAIR AND DIAGNOSTIC SYSTEM AND METHOD

FIELD

The present disclosure relates to systems for repairing and troubleshooting vehicle electronic modules.

BACKGROUND

The statements in this section merely provide background information related to the present disclosure and may not constitute prior art.

Repair technicians can have difficulty learning and remembering how to troubleshoot and fix electrical systems (e.g., wiring harnesses, connectors, and the individual modules or devices connected thereto) of vehicles. This can be particularly problematic as the electrical systems of modern vehicles have become increasingly complex. In order to diagnose and fix such electrical systems, an in depth understanding of the wiring harness routing through the vehicle, the module or device layout locations in the vehicle, the functionality and location of in-line connectors including their individual pin layouts, and circuits are typically required.

It can also be particularly difficult to learn how to troubleshoot and fix electrical systems of new vehicles or new configurations of vehicles which may differ from the electrical systems with which a repair technician is familiar. As such, it can be time consuming and costly to diagnose, troubleshoot, and fix electrical system problems in modern vehicles.

The present disclosure addresses these and other issues associated with repairing and troubleshooting vehicle electronic modules.

SUMMARY

In one form, a method for troubleshooting an electronic system of a vehicle includes receiving a diagnostic trouble code set into a diagnostic system. The diagnostic trouble code set includes one or more diagnostic trouble codes. The method includes receiving diagnostic specifications. The diagnostic specifications associate connector pins and wires of the electronic system with possible diagnostic trouble codes. The method includes receiving wiring circuit specifications. The wiring circuit specifications associate wiring circuits of the electronic system with the connectors of the electronic system. The method includes determining a set of possible repair locations based on the diagnostic trouble code set, the diagnostic specifications, and the wiring circuit specifications, and displaying at least one possible repair location of the set of possible repair locations. According to a variety of alternate forms: the method includes ranking each possible repair location of the set of possible repair locations; ranking each possible repair location includes considering a repair difficulty factor; the method further includes displaying an image of at least a portion of the electronic system in a representation of the vehicle and identifying the at least one possible repair location on the image; the image includes a 3-dimensional model of the at least a portion of the electronic system; the image includes a wiring diagram of the electronic system; the electronic system is installed in the vehicle and the vehicle is one vehicle of a set of vehicles, the method further includes receiving repair data from different vehicles within the set of vehicles, the different vehicles being different than the vehicle, and the step of determining the set of possible repair locations is further based on the repair data from the different vehicles and a build sequence of the set of vehicles; the possible repair locations include one or more connector; the diagnostic trouble code set includes trouble codes associated with at least two different circuits of the electronic system, wherein the at least two different circuits share a common connector, wherein the possible repair locations includes the common connector; the possible repair locations include a location along a wire of the electronic system; the diagnostic trouble code set includes trouble codes associated with at least two different circuits of the electronic system, wherein the at least two different circuits each include a length of wire routed through a common region of the vehicle, wherein the possible repair locations includes the common region; the wiring data includes wiring schematics of the electronic system; the at least one possible repair location is displayed on the wiring schematics of the electronic system; the method further includes receiving repair locations that correspond to successful repairs done on different vehicles that had diagnostic trouble codes similar to the diagnostic trouble code set; the diagnostic specifications associate connector identifiers of the connectors of the electronic system with possible diagnostic trouble codes, wherein the wiring circuit specifications associate circuit identifiers of the wiring circuits of the electronic system with the connector identifiers.

According to another form, a diagnostics system for troubleshooting an electronic system installed on a vehicle includes a test device, a controller, and a display. The test device is configured to test the electronic system. The controller is configured to receive test data from the test device. The controller is configured to determine a set of possible repair locations based on a diagnostic trouble code set, a set of diagnostic specifications of the electronic system, and a set of wiring circuit specifications of the electronic system. The display is in communication with the controller. The controller is configured to control the display to output at least one possible repair location of the set of possible repair locations. According to a variety of alternate forms: the controller is configured to rank each possible repair location of the set of possible repair locations; the controller is configured to control the display to output an image of at least a portion of the electronic system such that the at least one possible repair location is shown on the image; the controller is configured to determine the set of possible repair locations further based on repairs done on other vehicles within a sequence of vehicles that includes the vehicle on which the electronic system is installed; the possible repair locations includes one or more connector of the electronic system, a location along a wire of the electronic system, or the one or more connector and the location along the wire.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
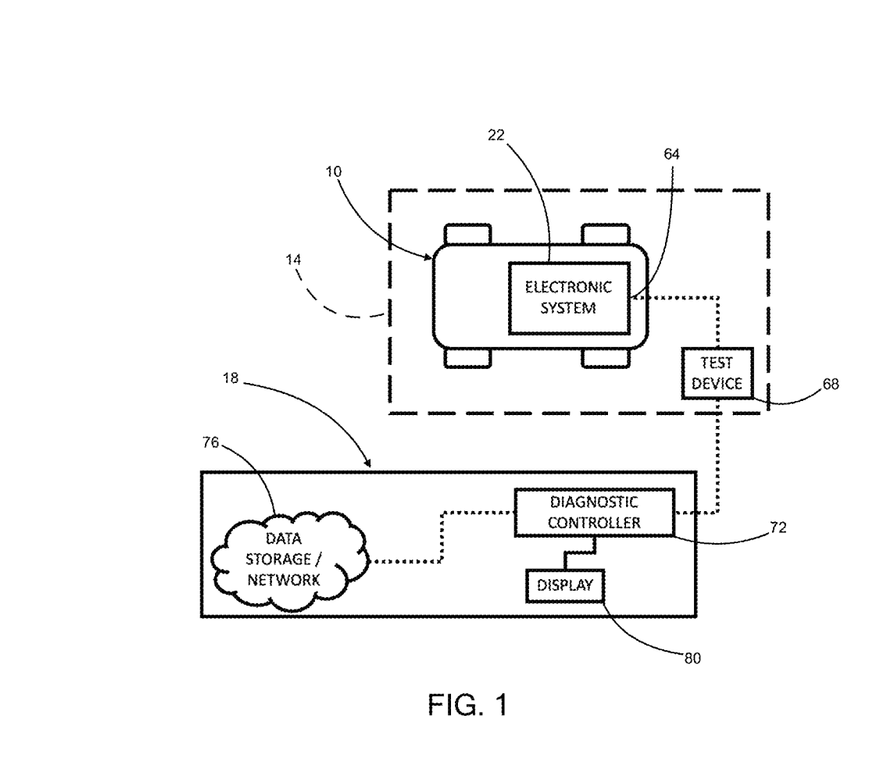
FIG. 1 is a schematic view of a vehicle in a test station including a diagnostic system in accordance with the teachings of the present disclosure.

Referring to FIG. 1, a vehicle 10 is schematically illustrated in a test station 14 along with a diagnostic system 18. The test station 14 is a location where the vehicle 10 is to be tested. The tests performed on the vehicle can include static tests (e.g., with the vehicle 10 stationary and the engine (not shown) or other propulsive motors (not shown) not engaged) or can be dynamic tests in which the engine or propulsive motors are engaged (e.g., the vehicle 10 is moving or is stationary but driving on a device such as a dynamometer).

Figure 2:
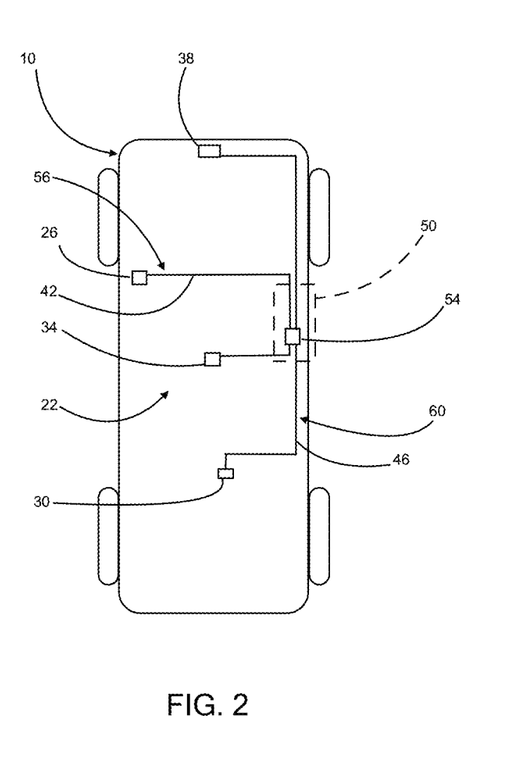
FIG. 2 is a schematic view of the vehicle of FIG. 1, illustrating several example components of a vehicle electronic system of the vehicle.

The vehicle 10 can be any suitable type of vehicle (e.g., an automobile, truck, sport utility vehicle, recreational vehicle, off-road vehicle) and includes a vehicle electronic system 22. Referring to FIG. 2, the electronic system 22 can include one or more electronic modules or devices connected by one or more wiring harnesses that include different circuits, wires, and connectors within the vehicle 10. In the example provided, a first module 26, a second module 30, a switch 34, a sensor 38, a set of first wires 42, and a set of second wires 46 are illustrated as being included in the electronic system 22, though additional modules, devices, and wiring may be used.

The electronic modules 26, 30 can be any electronic module within the vehicle, e.g., an engine control module (ECM), powertrain control module (PCM), transmission control module (TCM), brake control module (BCM or EBCM), central control module (CCM), central timing module (CTM), general electronic module (GEM), body control module (BCM), suspension control module (SCM), entertainment systems, communication systems, climate control systems, among others. Devices such as the switch 34 and/or sensor 38 can be any suitable device connected to the corresponding modules via the corresponding set of wires 42, 46.

In the example provided, the first module 26 and switch 34 are located in different areas of the vehicle 10 and connected by the first wires 42. The first wires 42 are routed through a region 50 of the vehicle 10 and a connector 54 connects the portion of the first wires 42 that come from the first module 26 with the portion of the first wires 42 that come from the switch 34. In the example provided, the connector 54 is located in the region 50. In the example provided, the second module 30 and the sensor 38 are located in different areas of the vehicle 10, which also happen to be different than the first module 26 and the switch 34. The second module 30 and the sensor 38 are connected by the second wires 46. In the example provided, the second wires 46 are also routed through the region 50 of the vehicle 10 and the connector 54 also connects the portion of the second wires 46 that come from the second module 30 with the portion of the second wires 46 that come from the sensor 38. The first module 26, first wires 42, and switch 34 may be considered components of a first circuit 56 of the electronic system 22. The second module 30, second wires 46, and sensor 38 may be considered components of a second circuit 60 of the electronic system 22. While two circuits 56, 60 are illustrated for example purposes, the vehicle 10 may include additional circuits. The particular routing of the circuits 56, 60 is shown for example purposes and other routes and connector configurations may be used. In one non-limiting example not shown, the first and second circuits 56, 60 do not share the common connector 54.

Referring back to FIG. 1, the vehicle electronic system 22 has at least one input/output 64 to which a test device 68 can be connected. The connection between the test device 68 and the input/output 64 can be a direct physical connection (e.g., direct contacts), a wired connection, or a wireless connection. The test device 68 can be configured to test one or more of the electronic modules (e.g., module 26 or 30 shown in FIG. 2) of the electronic system 22. Some non-limiting example tests may include attempting to loading software on a module (e.g., module 26 or 30 shown in FIG. 2) of the electronic system 22, testing if any modules are not reporting on the vehicle CAN bus (not specifically shown), voltage or current or other signal response, among other tests.

The test device 68 can receive one or more diagnostic trouble codes (DTCs) (also referred to herein at a "diagnostic trouble code set" or "DTC set") from the electronic system 22 based on errors or malfunctions within the electronic system 22. The test device 68 can be connected to the diagnostic system 18 to communicate the DTCs thereto.

In the example provided, the diagnostic system 18 includes a diagnostic controller 72, data storage 76 (e.g., hard drive, cloud storage, or other memory circuit or device), and a display 80. The test device is connected for communication with the diagnostic controller 72. The connection between the test device 68 and the diagnostic controller 72 can be a direct physical connection, a wired connection, or a wireless connection. The diagnostic controller 72 may be located within the test station 14 or may be located remote therefrom. In one configuration, the test device 68 can be connected to the electronic system 22, receive the DTCs therefrom, unplugged from the electronic system 22, then subsequently plugged into communication with the diagnostic controller 72 to upload the DTCs thereto.

In another configuration, the test device 68 can be connected to the electronic system 22 at the same time as being connected to the diagnostic controller 72 such that the test device 68 runs the tests, receives the DTCs and forwards the DTCs to the diagnostic controller 72. In another alternative configuration the test device 68 can be a module of the diagnostic controller 72 or otherwise located in a common housing (not specifically shown) with the diagnostic controller 72.

The display 80 is connected to the diagnostic controller 72 for communication therewith. The display 80 can be any suitable type of display or monitor capable of visually outputting images and text. The diagnostic controller 72 is configured to control what is shown on the display 80.

The data storage 76 is connected for communication with the diagnostic controller 72. The data storage 76 can include memory located within the common housing (not shown) that contains the diagnostic controller 72 and/or can include memory located remotely such as on a network or cloud storage for example. The data may be stored in any suitable format such as databases, text, or images for example. In other words, the diagnostic controller 72 can access and retrieve data from the data storage 76.

Figure 3:
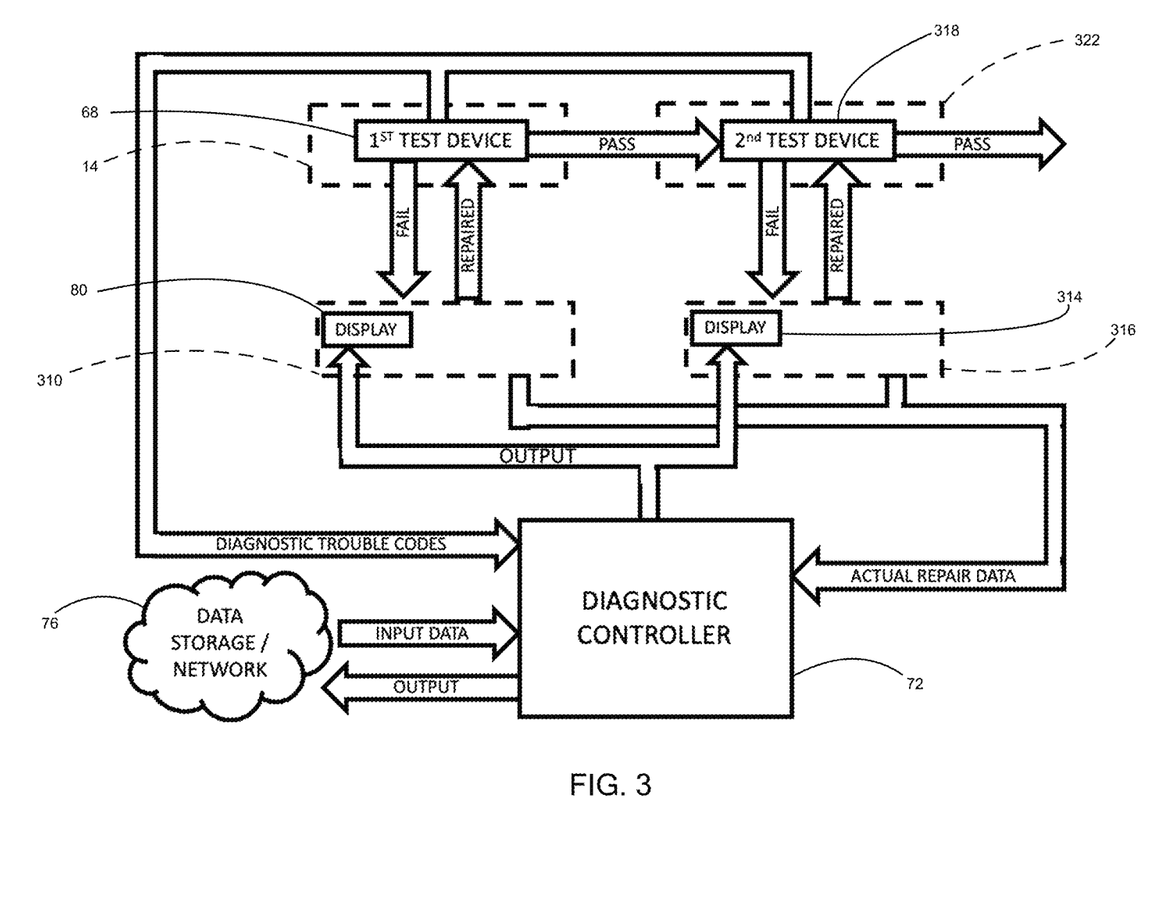
FIG. 3 is a flow chart schematically illustrating steps of testing an electronic system of a vehicle and illustrating a flow of information to and from a diagnostic controller of a diagnostic system in accordance with the teachings of the present disclosure.

Referring to FIG. 3, the diagnostic controller 72 receives input data from the data storage 76 and DTCs from the test device 68 in the first test station 14. In the example shown in FIG. 3, the diagnostic controller 72 is centralized and connected to the display 80 located in a first repair station 310 and also to a second display 314 located in a second repair station 316. In the example provided, the diagnostic controller 72 also receives DTCs from a second test device 318 which may test different modules (not specifically shown) than those tested by the test device 68.

The diagnostic controller 72 may also receive actual previous repair data from the first repair station 310 indicative of what repairs were done in response to the DTCs and which repairs were successful and/or unsuccessful. In the example provided, the diagnostic controller 72 also receives actual previous repair data from the second repair station 316 and may receive actual previous repair data from other repair stations (not shown). The previous repair data may also include a vehicle build sequence number that identifies the vehicle 10 (FIGS. 1 and 2) as it relates in time or order of being constructed to other vehicles (not shown) in a sequence of vehicles built. In this way, the diagnostic controller 72 can check if other vehicles (not shown) that were built near the same time and manufacturing location had similar DTCs code issues and can check how those vehicles (not shown) were fixed. The diagnostic controller 72 can then use that information to aid in recommending similar fixes for the current vehicle 10 (FIGS. 1 and 2).

The diagnostic controller 72 can also output data to the data storage 76, such as to update the data storage 76. The diagnostic controller 72 outputs recommended repairs to the appropriate displays (e.g., display 80 and 314) so that an operator may choose and make the appropriate repairs. The diagnostic controller 72 can also output notifications to other systems such as manufacturing systems or operators. For example, the diagnostic controller 72 may recognize a pattern in the DTCs and their successful repairs that indicates an error in a particular step of the manufacturing process. Thus, the diagnostic controller 72 may notify the appropriate manufacturing system or operators to investigate and modify a manufacturing process.

In alternative configurations, not specifically shown, the diagnostic controller 72 may be connected to a single repair station, the diagnostic controller 72 may be located in a particular repair station, the diagnostic controller 72 may be portable and movable between repair stations, and/or the diagnostic controller 72 may be connected to more than two repair stations.

In operation, one or more modules of the electronic system 22 (FIGS. 1 and 2) are tested by the first test device 68 in the first test station 14. If the electronic system 22 (FIGS. 1 and 2) passes the test, the vehicle 10 (FIGS. 1 and 2) may move to the second test station 322 if additional tests are needed, where the second test device 318 may perform one or more other tests on the electronic system 22 (FIGS. 1 and 2). The second test station 322 may be located in the same or different physical area. For example, the vehicle may physically move to the next test station, or may remain stationary while the test station effectively changes. If the electronic system 22 (FIGS. 1 and 2) passes the tests of the second test station 322, the vehicle 10 (FIGS. 1 and 2) may move to additional test stations (not specifically shown) until all desired tests are passed.

If the electronic system 22 (FIGS. 1 and 2) does not pass the tests of the first test device 68 (e.g., returns DTCs), then the vehicle 10 (FIGS. 1 and 2) may be moved to the first repair station 310. The first repair station 310 may be located in the same or different physical area. For example, the vehicle may physically move to the repair station 310, or may remain stationary while the test station 14 effectively changes to be the repair station 310. The first repair station 310 includes the display 80. An operator (not shown) then reviews recommended repairs on the display 80 and performs a recommended repair on the vehicle 10 (FIGS. 1 and 2). The repaired vehicle 10 (FIGS. 1 and 2) can then be tested again by the test device 68 and the process repeated until the electronic system 22 (FIGS. 1 and 2) passes. The process for the second test station 322 and second repair station 316 may be similar.

Figure 4:
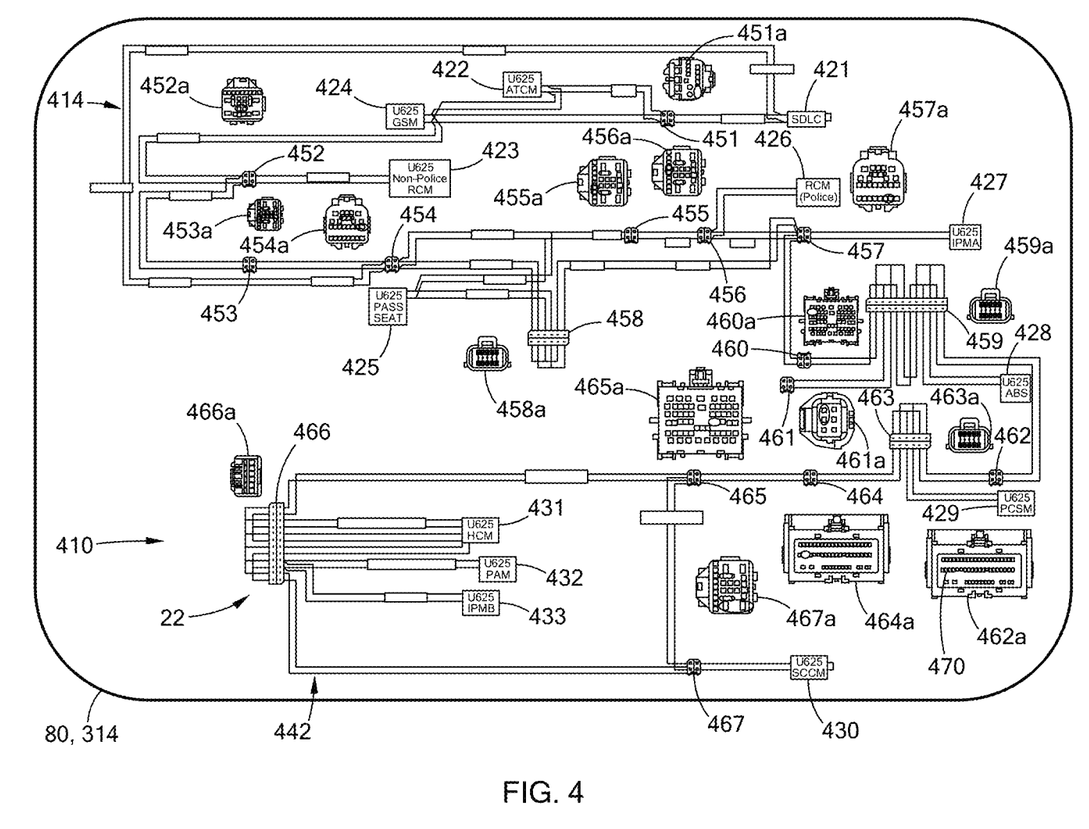
FIG. 4 is an example display screen of a diagnostic system in accordance with the teachings of the present disclosure, illustrating an image of a wiring circuit of a vehicle electronic system.

Referring to FIG. 4, an example display screen 410 is illustrated. The display 80 may show this display screen 410. While described herein with reference to the display 80, the second display 314 may be similar and may show a similar screen. The display screen 410 includes one or more images indicative of the electronic system 22 and may include associated textual, numeric, or symbolic descriptions. The display 80 may optionally be a touch screen or may include other input devices such as a keyboard (not shown) and/or mouse (not shown) for example. In the example provided, the display screen 410 includes an image of a wiring diagram 414 of the electronic system 22. The wiring diagram 414 indicates links between modules or devices (e.g., modules 421, 422, 423, 424, 425, 426, 427, 428, 429, 4230, 431, 432, 433, collectively referred to as "modules 421-433"), such as by wires 442 and connectors 451, 452, 453, 454, 455, 456, 457, 458, 459, 460, 461, 462, 463, 464, 465, 466, 467 (collectively referred to as "connectors 451-467") that connect portions of the wires 442. In the example provided, the display screen 410 also includes images of the connectors 451-467 as indicated by reference numerals 451a, 452a, 453a, 454a, 455a, 456a, 457a, 458a, 459a, 460a, 461a, 462a, 463a, 464a, 465a, 466a, 467a (collectively referred to as "connectors 451a-467a"). The images of the connectors 451a-467a illustrate locations of pins (e.g., pin 470) within the connector 451-467 as viewed looking head on into the connector 451-467. The locations of pins such as pin 470 can be associated with specific pin numbers that identify the location of the pin in the connector 451-467. While discussed and shown with reference to the connectors 451-467, the modules 421-433 can also have pins for connecting to the test device 68 (FIGS. 1 and 3) or other devices (not shown) which can be associated with specific pin numbers that identify the location of the pin in the module 421-433. The diagnostic controller 72 (FIGS. 1 and 3) and display 80 can be configured such that the operator (not shown) may select modules or devices (e.g., modules 421-433), segments of wires 442, connectors 451-467 (or images of the connectors 451a-467a), or pins (e.g., pin 470) to display additional information about the selected component (e.g., part number, physical location, installation instructions, tools needed, troubleshooting instructions, testing instructions, etc.).

Figure 5:
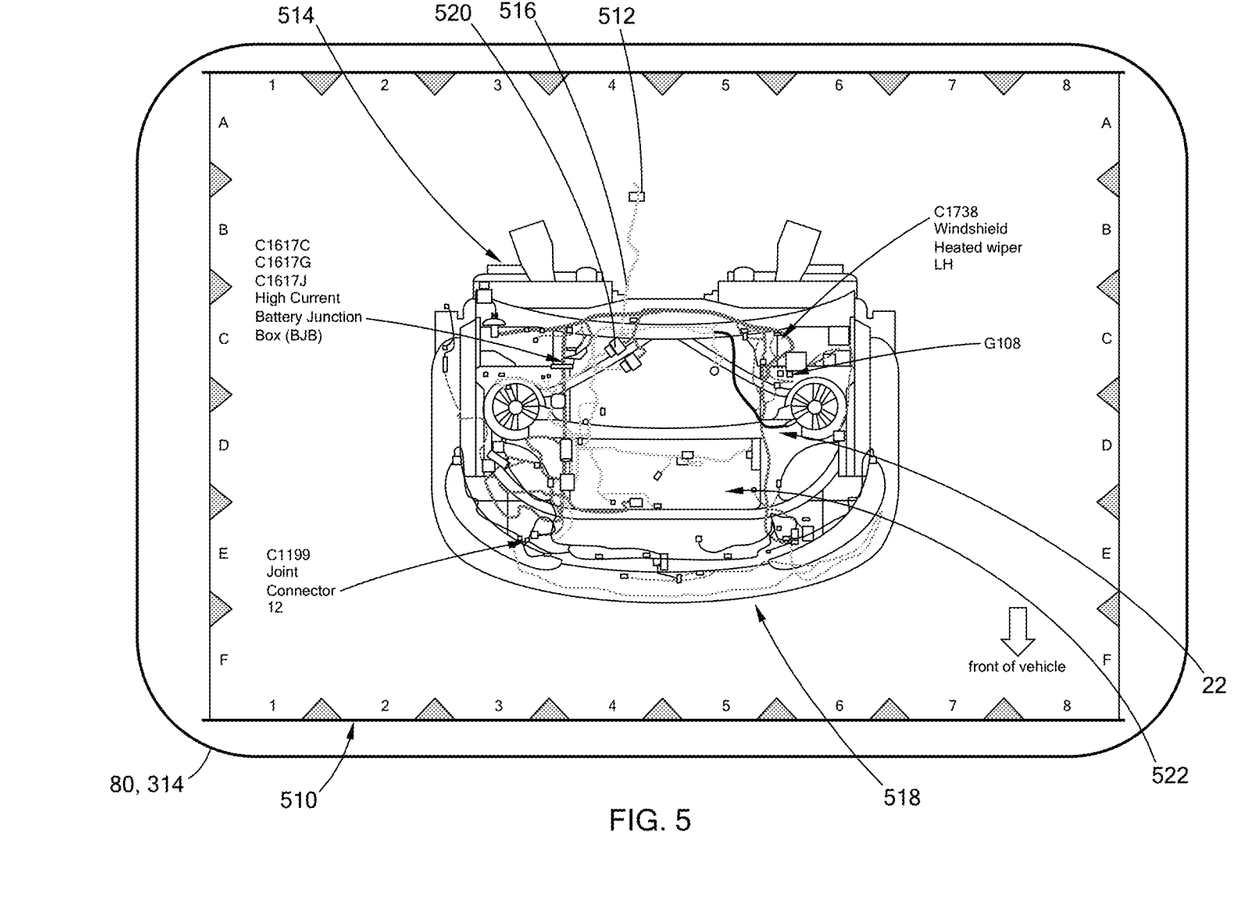
FIG. 5 is a different example display screen of a diagnostic system in accordance with the teachings of the present disclosure, illustrating an image of a 3D model of portions of an electronic system in a vehicle.

Referring to FIG. 5, another example display screen 510 is illustrated. The display 80 may show this display screen 510. While described herein with reference to the display 80, the second display 314 may be similar and may show a similar screen. The display screen 510 includes one or more images indicative of the electronic system 22 and may include associated textual, numeric, or symbolic descriptions. In the example provided, the display screen 510 includes an image of a 3-D computer aided drafting (CAD) model 514 of a portion of the vehicle 10 including a portion of the electronic system 22 as it is routed and positioned within the vehicle 10. Accordingly, it is easy for an operator to see exactly where certain modules or devices (e.g., module 512), wires (e.g., wires 516), or connectors (e.g., connector 520) are physically located in the vehicle 10. In the example provided, a front portion 518 of the vehicle 10 is shown, including an engine bay 522, though other portions of the vehicle can be shown depending on the components tested or the location of possible repairs.

In the example provided, the display screen 510 may also display other information useful to the operator, such as part numbers for different components of the electronic system 22 and other information related to the components (e.g., name, function, instructions, etc.) The diagnostic controller 72 (FIGS. 1 and 2) and display 80 can be configured such that the operator (not shown) may select modules or devices, segments of wires, or connectors to display additional information about the selected component (e.g., part number, installation instructions, troubleshooting instructions, testing instructions, zoomed in or alternate view of the component, etc.). In one configuration, the operator may also manipulate (e.g., rotate, zoom, pan) the CAD model 514 to view the electronic system 22 from different angles. The diagnostic controller 72 (FIGS. 1 and 2) and display 80 can also be configured to highlight or identify specific components (modules devices, connectors, or wires) or locations along wires where possible repair may be needed on the display screen 510.

Either display screen 410 or 510 or other display screens (not shown) may include a list of possible repairs which may be ranked in order of which repairs should be attempted first.

Figure 6:
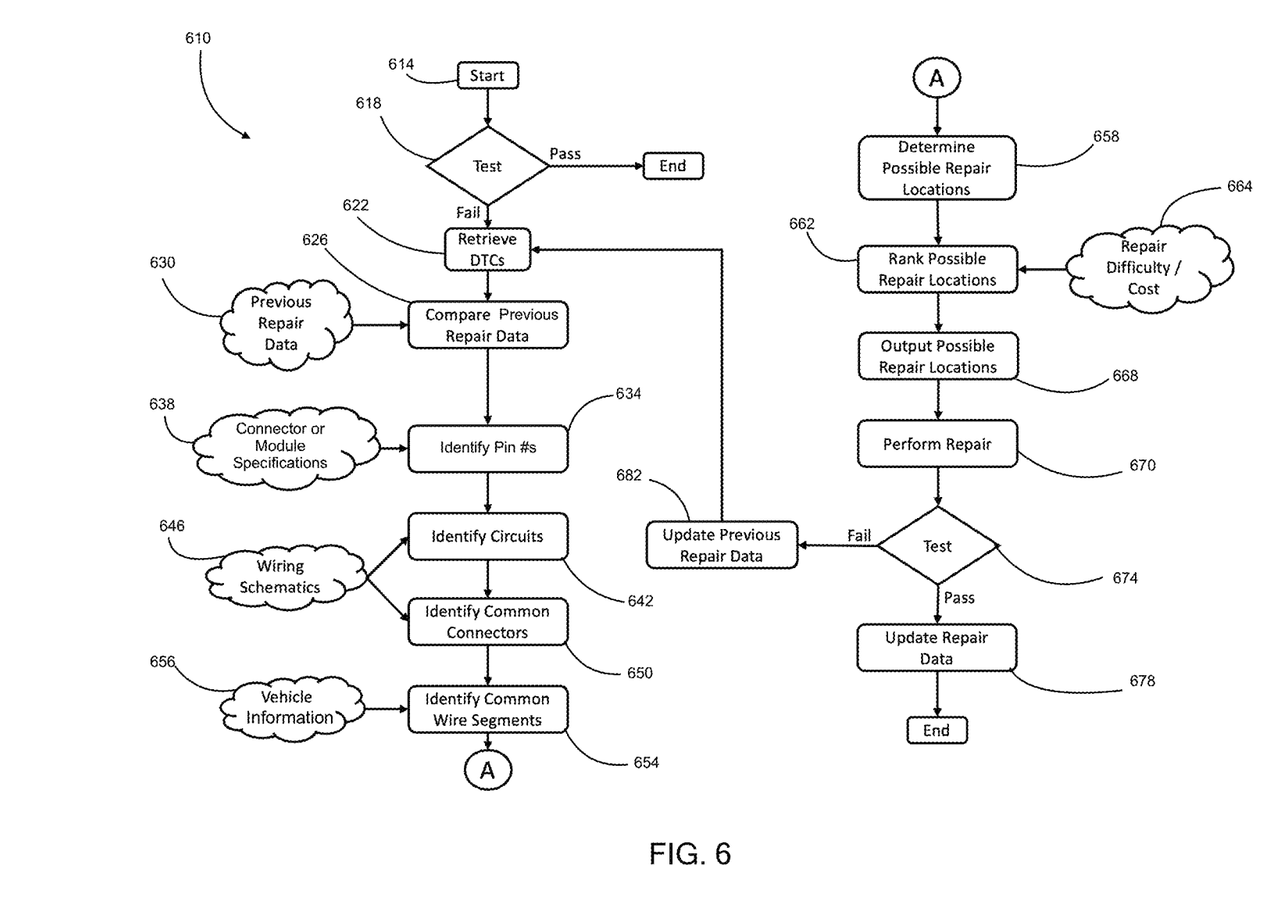
FIG. 6 is a flow chart of a method of troubleshooting a vehicle electronic system in accordance with the teachings of the present disclosure.

Referring to FIG. 6, a flow chart of a method 610 of repairing the vehicle 10 including operation of the diagnostic system 18 (FIGS. 1 and 2) is illustrated. The method 610 can start at step 614 and proceed to step 618. At step 618, the test device 68 (FIGS. 1 and 3) is used to test the electronic system 22 (FIGS. 1-3). If the electronic system 22 passes the tests, then the vehicle 10 (FIGS. 1 and 2) can move on from the test station 14 (FIGS. 1 and 3).

If the test does not pass, the method 610 proceeds to step 622 where the diagnostic controller 72 (FIGS. 1 and 3) receives DTCs from the test device 68 (FIGS. 1 and 3). The method 610 can proceed to step 626.

At step 626, the diagnostic controller 72 (FIGS. 1 and 3) receives previous repair data 630 (if applicable) from the data storage 76 (FIGS. 1 and 3). The previous repair data 630 includes data associating DTCs with standard repairs for those DTCs, but can also include data associating DTCs from previous tests on the currently tested vehicle with previous repair operations done. The previous repair data 630 can also include data associating DTCs from tests done on other vehicles with repair operations done on those vehicles and whether or not those repair operations fixed the problem. At step 626, the diagnostic controller 72 (FIGS. 1 and 3) can compare the DTCs with this previous repair data 630.

After step 626, the method 610 can proceed to step 634. At step 634, the diagnostic controller 72 (FIGS. 1 and 3) identifies pin numbers of the module(s) (i.e., module pin numbers) corresponding to the DTCs. The diagnostic controller 72 (FIGS. 1 and 3) may retrieve and use diagnostic specifications 638 of connectors, the module or modules being tested and then use these diagnostic specifications 638 to identify the connector or module pin numbers and/or wires. The diagnostic specifications 638 can be retrieved from the data storage 76 (FIGS. 1 and 3) and can associate connector pins and wires of the electronic system 22 with possible diagnostic trouble codes.

After step 634, the method 610 can proceed to step 642. At step 642, the diagnostic controller 72 (FIGS. 1 and 3) identifies circuits that correspond to the module pin numbers as possible problem circuits. The diagnostic controller 72 (FIGS. 1 and 3) can use wiring circuit specifications such as wiring schematics 646 or data corresponding to wiring schematics 646 retrieved from the data storage 76 (FIGS. 1 and 3) to identify the circuits corresponding to the module pin numbers.

After step 642, the method 610 can proceed to step 650. At step 650, the diagnostic controller 72 (FIGS. 1 and 3) identifies connectors that are common among the possible problem circuits identified in step 642. The diagnostic controller 72 (FIGS. 1 and 3) can use the wiring schematics 646 or data corresponding to the wiring schematics 646 retrieved from the data storage (FIGS. 1 and 3) to identify the common connectors. For example, the connector 54 shown in FIG. 2 is common among the circuits 56, 60 (FIG. 2).

After step 650, the method 610 can proceed to step 654. At step 654, the diagnostic controller 72 (FIGS. 1 and 3) identifies wire segments that are routed through a common region of the vehicle 10 (FIGS. 1 and 2). The diagnostic controller 72 (FIGS. 1 and 3) retrieves and can use information 656 about the vehicle 10 (FIGS. 1 and 2) that correlates regions of the vehicle 10 (FIGS. 1 and 2) with connectors and segments of wires in different circuits to identify the common connectors or wire segments or the common region of the vehicle 10 (FIGS. 1 and 2). For example, the region 50 is common among the circuits 56, 60 as shown in FIG. 2. In one example, the information 656 can be a 3-dimensional CAD model of the electronic system 22 in the vehicle (FIGS. 1 and 2) and the correlations between physical regions of the vehicle 10 (FIGS. 1 and 2) and the connectors and segments of wires in different circuits can be derived from the CAD model. In another configuration, the information 656 may include one or more 2-dimensional images of the electronic system 22 in the vehicle 10 (FIGS. 1 and 2) and the correlations between physical regions of the vehicle 10 (FIGS. 1 and 2) and the connectors and segments of wires in different circuits may be derived from the images. In another configuration, the information 656 may include a database that correlates the physical regions of the vehicle 10 (FIGS. 1 and 2) with connectors and segments of wires in different circuits.

After step 654, the method 610 can proceed to step 658. At step 658, the diagnostic controller 72 (FIGS. 1 and 2) can determine possible repair locations based on the identified common connectors and the identified common wire segments or regions of the vehicle 10 (FIGS. 1 and 2). The diagnostic controller 72 (FIGS. 1 and 3) can populate a list of such possible repair locations.

After step 658, the method 610 can proceed to step 662. At step 662, the diagnostic controller 72 (FIGS. 1 and 3) can rank the possible repair locations. The ranking can be based on factors such as probability of the repair working. The probability of the repair working can be based on known factors such as the connector or module diagnostic specifications 638, wiring schematics 646, or previous repair data 630. The ranking may also be based on cost and/or difficulty of the repair and/or time needed to complete the repair. The diagnostic controller 72 (FIGS. 1 and 3) can retrieve data 664 from the data storage 76 (FIGS. 1 and 3) correlating a cost and/or difficulty and/or time score or factor with different repairs. In one example, the diagnostic controller 72 (FIGS. 1 and 3) may rank low cost and/or low difficulty repairs and/or quick repairs as higher (i.e., as preferred repairs) so that these repairs can be tried first before more costly, difficult, or time consuming repairs are attempted.

After step 662, the method 610 can proceed to step 668. At step 668, the diagnostic controller 72 (FIGS. 1 and 3) can output one or more of the possible repairs to the display 80 (FIGS. 1 and 3). The display 80 (FIGS. 1 and 3) may show just the highest ranked possible repair or a list of the possible repairs and their rankings. The display 80 (FIGS. 1 and 3) can show the location(s) of the possible repair(s) on the wiring diagram (e.g., display screen 410 shown in FIG. 4) or may show the location(s) of the possible repair(s) on an image of the vehicle 10 (e.g., display screen 510 shown in FIG. 5). The diagnostic controller 72 (FIGS. 1 and 3) may permit the operator to switch between such display options.

After step 668, the method 610 can proceed to step 670. At step 670, the operator performs a repair from the possible repairs, such as the highest ranked possible repair.

After step 670, the method 610 can proceed to step 674. At step 674, the electronic system 22 (FIGS. 1 and 2) can again be tested with the test device 68 (FIGS. 1 and 3). If the test passes, the method 610 may proceed to step 678. At step 678 the diagnostic controller 72 (FIGS. 1 and 3) can update the previous repair data 630 to include the repairs and DTCs performed and the outcome of the repair. The vehicle 10 (FIGS. 1 and 2) can then move on from the test station 14 (FIGS. 1 and 3).

If the test at step 674 does not pass, the method 610 can proceed to step 682. At step 682 the diagnostic controller 72 (FIGS. 1 and 3) can update the previous repair data 630 to include the repairs and DTCs performed and the outcome of the repair.

After step 682, the method 610 can return to step 622 to retrieve the DTCs from the test performed at step 674 and then continue through the method 610 with these new DTCs until the electronic system 22 (FIGS. 1 and 2) passes the tests.

In the above described method 610, the diagnostic controller 72 (FIGS. 1 and 3) can use machine learning in step 626 through step 662 to determine and rank possible repair locations. Some non-limiting examples of machine learning algorithm types that may be used include instance based algorithms and decision tree algorithms. Instance based algorithms can generally compare new data to a built-up database of information to predict a solution. Some non-limiting examples of instance based algorithms include k-Nearest Neighbor (kNN), Learning Vector Quantization (LVQ), Self-Organizing Map (SOM), Locally Weighted Learning (LWL), Support Vector Machines (SVM). Decision tree algorithms can generally construct a model of decisions made based on actual values of attributes in known or training data to make prediction decisions for a set of input data. Some non-limiting examples of decision tree algorithms include Classification and Regression Tree (CART), Iterative Dichotomiser 3 (ID3), C4.5 and C5.0, Chi-squared Automatic Interaction Detection (CHAID), Decision Stump, M5, and Conditional Decision Trees.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of troubleshooting an electronic system of a vehicle, the method comprising:
   performing a test on one or more electronic control modules of the vehicle, wherein performing the test includes at least one of loading software on the one or more electronic control modules and determining whether the one or more electronic control modules are outputting data via the electronic system;
   generating a diagnostic trouble code set based on the test, the diagnostic trouble code set including a plurality of diagnostic trouble codes, wherein at least one diagnostic trouble code of the diagnostic trouble code set is associated with a first component, wherein at least one other diagnostic trouble code of the diagnostic trouble code set is not associated with the first component but is associated with a second component;
   receiving diagnostic specifications, the diagnostic specifications associating connector pins and wires of the electronic system with possible diagnostic trouble codes;
   receiving wiring circuit specifications, the wiring circuit specifications associating wiring circuits of the electronic system with the connectors of the electronic system;
   determining that the first component and the second component are connected to a common connector based on the wiring circuit specifications;
   determining a plurality of possible repair locations based on the diagnostic trouble code set, the diagnostic specifications, and the wiring circuit specifications, wherein a location of the common connector is one of the possible repair locations of the plurality of repair locations;
   generating a ranking for each possible repair location of the plurality of possible repair locations based on at least one of a probability of a repair being successful, a difficulty of the repair, and an amount of time for completing the repair;
   selecting at least one possible repair location of the plurality of possible repair locations based on the ranking of each possible repair location of the plurality of possible repair locations; and
   displaying the at least one possible repair location.

2. The method according to claim 1 further comprising displaying an image of at least a portion of the electronic system in a representation of the vehicle and identifying the at least one possible repair location on the image.

3. The method according to claim 2, wherein the image includes a 3-dimensional model of the at least a portion of the electronic system.

4. The method according to claim 2, wherein the image includes a wiring diagram of the electronic system.

5. The method according to claim 1, wherein the electronic system is installed in the vehicle and the vehicle is one vehicle of a set of vehicles, the method further comprising:
   receiving repair data from different vehicles within the set of vehicles, the different vehicles being different than the vehicle,
   wherein the step of determining the plurality of possible repair locations is further based on the repair data from the different vehicles and a build sequence of the set of vehicles.

6. The method according to claim 1, wherein the possible repair locations include one or more connectors.

7. The method according to claim 1, wherein the possible repair locations include a location along a wire of the electronic system.

8. The method according to claim 1, wherein the diagnostic trouble code set includes trouble codes associated with at least two different circuits of the electronic system, wherein the at least two different circuits each include a length of wire routed through a common region of the vehicle, wherein the possible repair locations includes the common region.

9. The method according to claim 1, wherein the wiring circuit specifications includes wiring schematics of the electronic system.

10. The method according to claim 9, wherein the at least one possible repair location is displayed on the wiring schematics of the electronic system.

11. The method according to claim 1 further comprising receiving repair locations that correspond to successful repairs done on different vehicles that had diagnostic trouble codes similar to the diagnostic trouble code set.

12. The method according to claim 1, wherein the diagnostic specifications associate connector identifiers of the connectors of the electronic system with possible diagnostic trouble codes, wherein the wiring circuit specifications associate circuit identifiers of the wiring circuits of the electronic system with the connector identifiers.

13. A diagnostics system for troubleshooting an electronic system installed on a vehicle, the diagnostics system comprising:
   a test device configured to perform a test on one or more electronic control modules of the vehicle and generate a diagnostic trouble code set based on the test, wherein performing the test includes at least one of loading software on the one or more electronic control modules and determining whether the one or more electronic control modules are outputting data via the electronic system, and wherein the diagnostic trouble code set includes a plurality of diagnostic trouble codes, wherein at least one diagnostic trouble code of the diagnostic trouble code set is associated with a first component, wherein at least one other diagnostic trouble code of the diagnostic trouble code set is not associated with the first component but is associated with a second component;
- a controller configured to receive test data from the test device, the controller configured to:
  - determining that the first component and the second component are connected to a common connector based on the wiring circuit specifications;
  - determine a plurality of possible repair locations based on the diagnostic trouble code set, a set of diagnostic specifications of the electronic system, and a set of wiring circuit specifications of the electronic system, wherein a location of the common connector is one of the possible repair locations of the plurality of repair locations, wherein the diagnostic specifications associate connector pins and wires of the electronic system with the diagnostic trouble code set, and wherein the wiring circuit specifications associates wiring circuits of the electronic system with the connectors of the electronic system;
  - generate a ranking for each possible repair location of the plurality of possible repair locations based on at least one of a probability of a repair being successful, a difficulty of the repair, and an amount of time for completing the repair; and
  - select at least one possible repair location of the plurality of possible repair locations based on the ranking of each possible repair location of the plurality of possible repair locations; and
  - a display in communication with the controller,
- wherein the controller is configured to control the display to output the at least one possible repair location.

14. The diagnostics system according to claim 13, wherein the controller is configured to control the display to output an image of at least a portion of the electronic system such that the at least one possible repair location is shown on the image.

15. The diagnostics system according to claim 13, wherein the controller is configured to determine the plurality of possible repair locations based on repairs done on other vehicles within a sequence of vehicles that includes the vehicle on which the electronic system is installed.

16. The diagnostics system according to claim 13, wherein the possible repair locations includes one or more connector of the electronic system, a location along a wire of the electronic system, or the one or more connector and the location along the wire.

17. The method according to claim 1, wherein the first component is located in a first region of the vehicle and the second component is located in a second region of the vehicle.

18. The method according to claim 17, wherein the common connector is located in a third region of the vehicle.

19. The method according to claim 13, wherein the first component is located in a first region of the vehicle and the second component is located in a second region of the vehicle.

20. A method of troubleshooting an electronic system of a vehicle, the method comprising:
- performing a test on one or more electronic control modules of the vehicle, wherein performing the test includes at least one of loading software on the one or more electronic control modules and determining whether the one or more electronic control modules are outputting data via the electronic system;
- generating a diagnostic trouble code set based on the test, the diagnostic trouble code set including one or more diagnostic trouble codes;
- receiving diagnostic specifications, the diagnostic specifications associating connector pins and wires of the electronic system with possible diagnostic trouble codes;
- receiving wiring circuit specifications, the wiring circuit specifications associating wiring circuits of the electronic system with the connectors of the electronic system;
- determining a plurality of possible repair locations based on the diagnostic trouble code set, the diagnostic specifications, and the wiring circuit specifications;
- generating a ranking for each possible repair location of the plurality of possible repair locations based on a probability of a repair being successful, a difficulty of the repair, and an amount of time for completing the repair;
- selecting at least one possible repair location of the plurality of possible repair locations based on the ranking of each possible repair location of the plurality of possible repair locations; and
- displaying the at least one possible repair location.

* * * * *